United States Patent [19]
Pendleton

[11] 3,964,692

[45] June 22, 1976

[54] WINCH SPOOL WITH DISC BRAKE SYSTEM

[75] Inventor: Earl M. Pendleton, Houston, Tex.

[73] Assignee: Mattco, Inc., Houston, Tex.

[22] Filed: Feb. 10, 1975

[21] Appl. No.: 548,669

Related U.S. Application Data

[63] Continuation of Ser. No. 385,333, Aug. 3, 1973, Continuation-in-part of Ser. No. 180,569, Sept. 15, 1971, abandoned.

[52] U.S. Cl. .............................. 242/54 R; 242/75.4; 242/156.2
[51] Int. Cl.² ................... B65H 75/00; B65H 23/06; B65H 59/38
[58] Field of Search ................ 242/54 R, 75, 75.4, 242/75.53, 156, 156.2; 188/72.4, 72.6

[56] References Cited
UNITED STATES PATENTS

| | | | |
|---|---|---|---|
| 2,964,440 | 12/1960 | Stevens | 242/75.53 X |
| 2,991,849 | 7/1961 | Erickson | 242/75.4 X |
| 3,717,313 | 2/1973 | Williams | 242/54 R |

*Primary Examiner*—Leonard D. Christian
*Attorney, Agent, or Firm*—Vinson, Elkins, Searls, Connally & Smith

[57] ABSTRACT

A winch spool having disc brake system, such as a heavy duty winch that might be mounted on the deck or chassis of a drilling rig or may be employed to control the anchoring devices of a floating drilling platform, for example. The brake system for the winch spool may comprise a brake disc adapter fixed to at least one of the circular end flanges of the winch spool and may include a vertical generally circular support portion from which extends a transverse generally cylindrical portion having a disc support flange at the free extremity thereof. A circular brake disc may be secured to the adapter support flange in spaced relation with the flange of the winch spool and may be provided with opposed friction surfaces disposed in generally parallel relation with the flange of the spool. A brake caliper mechanism may be pivotally connected to the winch support and may be movable from an operative position, where brake block systems carried thereby are received about the brake disc, to an inoperative position, where the caliper mechanism is completely disengaged from the brake disc allowing access to the brake shoes for purposes of cleaning, repair or replacement. A control system is provided for actuation of the disc brake mechanism which utilizes an air pressurized hydraulic system that is also capable of locking the brake system to prevent rotation of the spool in the event the pneumatic pressure in the system is reduced below a predetermined minimum for any reason.

18 Claims, 9 Drawing Figures

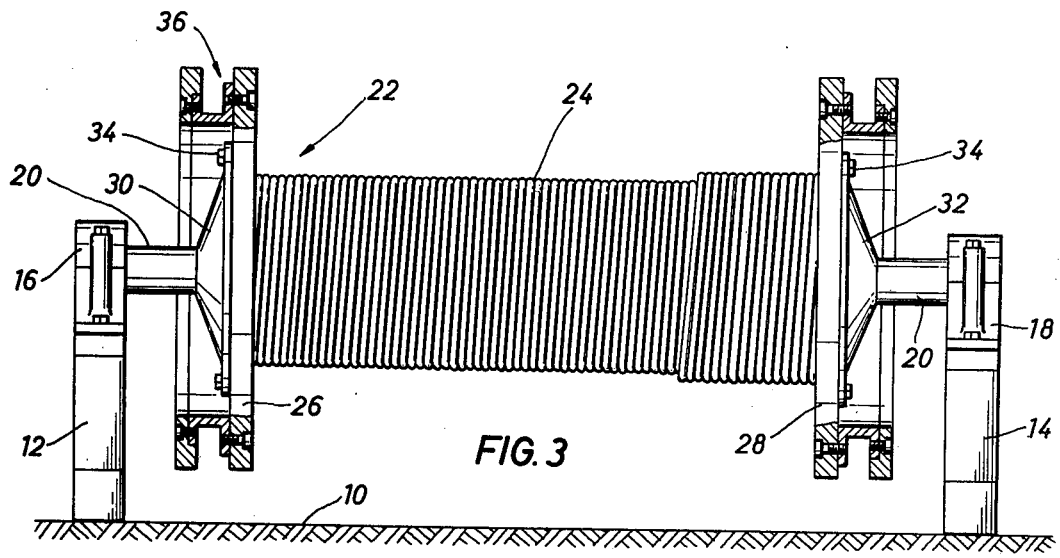
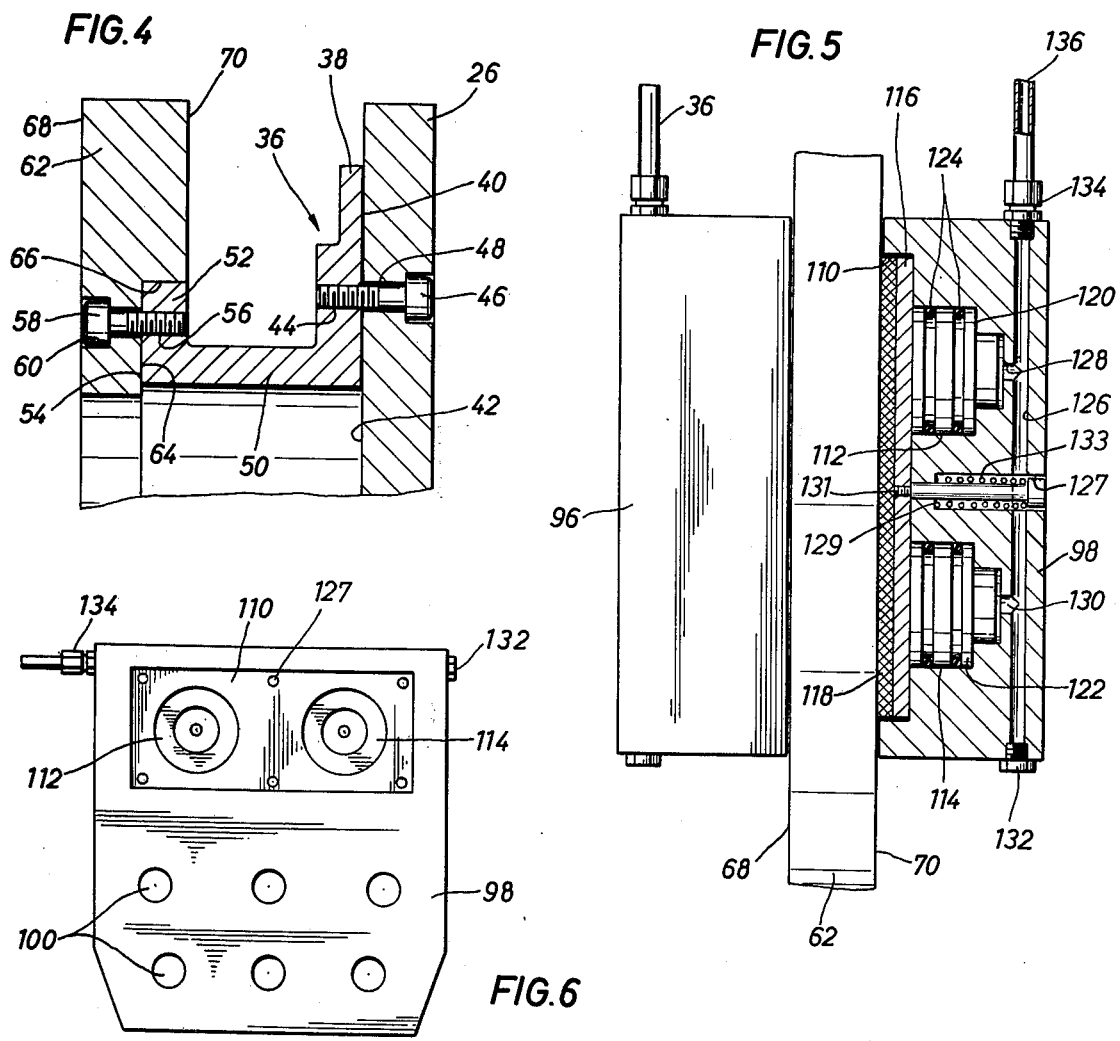

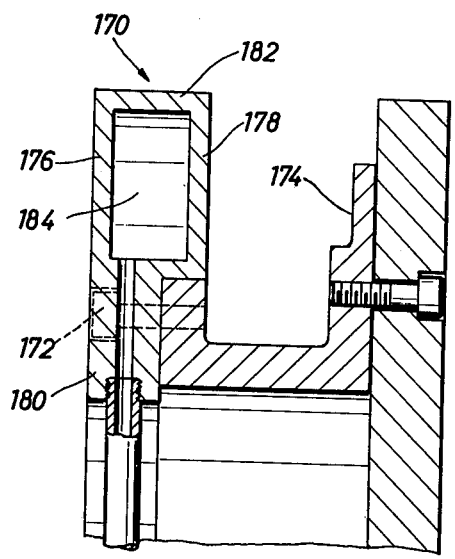
FIG. 7
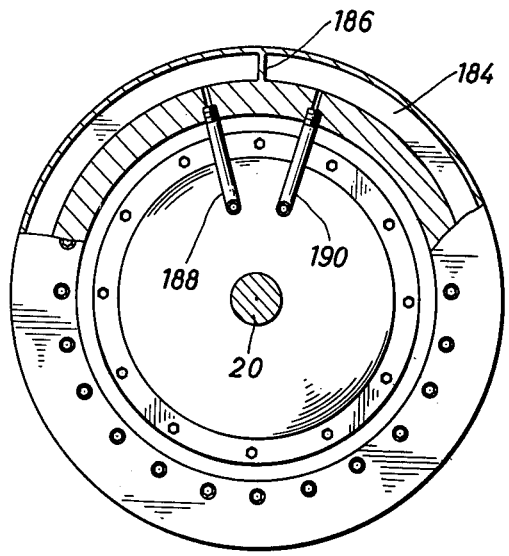
FIG. 8
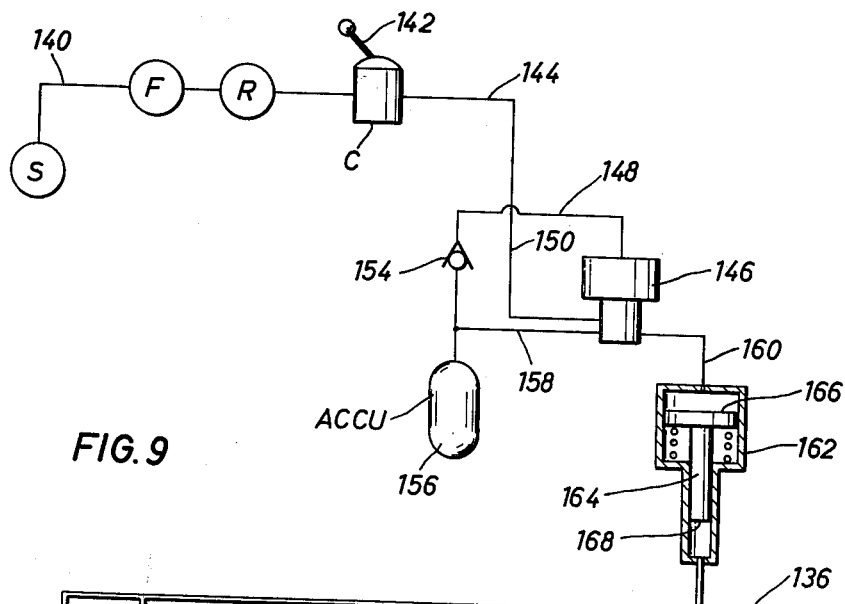
FIG. 9
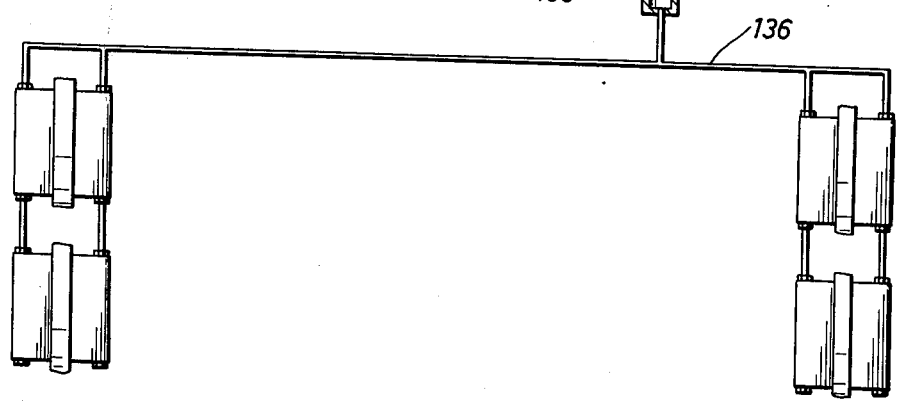

WINCH SPOOL WITH DISC BRAKE SYSTEM

This application is a continuation of my prior co-pending U.S. Pat. Application Ser. No. 385,333, filed Aug. 3, 1973 which is a continuation-in-part of U.S. Pat. Application Ser. No. 180,569, filed Sept. 15, 1971 (now abandoned), in the name of Earl M. Pendleton and entitlted DISC BRAKE SYSTEM.

FIELD OF THE INVENTION

This invention relates generally to winch brake systems and more particularly is directed to a winch structure having a disc brake system, such as might be employed to provide braking for the cable spool or spools of a drilling rig draw works, such as is commonly used in drilling or doing other work related to oil wells. While the invention finds particular application for use in association with winch systems of drilling rig draw works, it is not intended to limit the invention to this particular application, it being obvious that the winch brake system is also capable of providing braking for other rotatable mechanical devices. For purposes of simplicity the invention will be described in its relation to drilling rigs that might be used to drill water or oil wells or to provide work-over services related to such wells.

BACKGROUND OF THE INVENTION

In the drilling or work-over of oil wells it is necessary to provide a "draw works," which is a mechanism powered by a motor mechanism having the capability of rotating the cable spools of winches to raise and lower heavy loads, such as the drill stem utilized for drilling oil wells. The cable from the spools is generally an extremely long length of cable, the free end of which is looped several times through a crown block at the top of the rig and traveling block to provide efficient mechanical advantage for adequate lifting capability for the drilling rig. When a heavy load is lowered with or held by a draw works mechanism, controlled lowering or holding is generally accomplished by means of a winch brake system. For example, a brake system is employed to slowly lower rotating drill pipe as a well is being drilled in order to control pressure exerted by the drill bit on the formation being drilled.

The cable spools of drilling rig draw works are generally provided with band type brake systems of the self-energized type which are tightened by friction forces as the brake is applied to enhance the braking capability of the brake mechanism. While the self-energizing feature of band brake systems enhances the braking capability thereof, it also creates a lost motion condition when it is desired to rotate the cable spool in the opposite direction. This feature frequently causes jarring of the draw works mechanism which is, of course, undesirable.

Band type brake systems for winches and the like are generally considered excessively expensive to service and maintain in proper operating condition because of the frequency of repair necessary and the amount of down time caused by repairs. Excessive maintenance expense is caused in part because the connecting links utilized to connect the brake bands to the brake system are subjected to continual wear as the brake bands are manipulated thereby requiring frequent servicing of the connecting links to ensure safe operation of the brake system. Moreover, replacement of worm brake bands is not only expensive but frequently requires a substantial period of down time for the brake band replacement or repair operation.

In view of recent developments in disc brake systems, it is considered generally advantageous to employ disc brake systems for virtually all types of winch mechanisms. To adapt conventional winch mechanisms with disc brake systems or to manufacture new winch mechanisms having disc brake systems has not been commercially feasible for a number of reasons until development of the present invention. If a disc brake system were constructed to act upon one or both of the flanges of a cable spool for a winch mechanism, the disc brake system would severely limit the amount of cable that could be received by the winch spool and might otherwise interfere with winding and unwinding of the cable from the spool. On drilling rigs, and in other environments as well, it is necessary because of the general lack of space, for the draw works to be as compact as possible. Accordingly, it is not practical, and in most cases not possible to enlarge the flanges of a winch cable spool in order to receive disc brake systems. Moreover, the width of the winch cable spool of a drilling rig draw works and the proximity of the winch spool to other structural elements of the drill works, typically prevents any winch design that would allow provision of a spool of sufficient length to incorporate a disc brake assembly. It is necessary therefore that a disc brake assembly for conventional winch mechanisms, be accommodated in no more space than is typically allowed for band type winch brake systems.

Although a disc brake system may be developed having a single disc applying a braking force to one side only of a winch spool flange, such structure is typically disadvantageous and in fact undesirable when the winch system must be of extremely heavy duty. For example, disc brake systems capable of providing adequate braking for a winch that supports up to 20,000 feet of heavy duty drill stem for example, could cause the flanges of the cable spool to yield or to become severely distorted. It is necessary, therefore, that an extremely heavy duty brake system of this nature be constructed in such manner that equal braking forces may be simultaneously applied to opposite sides of a brake disc.

It is accordingly a primary object of the present invention to provide a novel disc brake system for rotatable mechanisms such as cable spools or the like that is capable of providing greater braking capability than band type braking systems of equivalent dimension.

It is another object of the present invention to provide a novel disc brake system for rotatable mechanisms such as cable spools that is not subject to lost motion movement upon reversing the rotation of the cable spool.

An even further object of the present invention contemplates the provision of a novel disc brake system that employs floating brake shoes that establish full braking engagement with a brake disc to ensure smooth and efficient braking operation.

It is another object of the present invention to provide a novel disc brake system that may include a safety locking mechanism that is automatically actuated responsive to predetermined undesirable conditions to provide locking against rotation as long as the predetermined undesirable condition exists.

Among the several objects of the present invention is noted the contemplation of a novel disc brake system for cable spools such as might be employed in a drilling rig draw works and that may include a fluid cooling capability to prevent brake fade and to enhance the service life of the braking surfaces.

It is also an important object of the present invention to provide a novel disc brake system for cable spools that may be utilized to convert conventional band type cable spool brake systems to disc brake systems.

It is an even further object of the present invention to provide a novel disc brake system incorporating brake shoes that may be replaced simply and easily with minimum down time.

Other and further objects, advantages and features of the present invention will become apparent to one skilled in the art upon consideration of the writtten specification, the attached claims and the annexed drawings. The form of the invention, which will now be described in detail, illustrates the general principles of the invention but it is to be understood that this detailed description is not to be taken as limiting the scope of the present invention.

THE PRIOR ART

While most brake systems for drilling rig draw works are of the band type discussed above, cable spool control devices of similar nature have been developed utilizing mechanically energized disc brakes of the nature taught by U.S. Pat. Nos. 2,959,253 and 3,247,934 to Goode. Such disc brake systems may employ air ventilation type cooling (3,247,934 Goode) or liquid bath type cooling (2,373,572 Lambert). Moreover, such disc brake mechanisms may be actuated hydraulically and as taught by the patent to Lambert 2,373,572.

SUMMARY OF THE INVENTION

A preferred embodiment of the invention may involve a winch spool having a brake disc adapter that may be fixed in any desirable manner to a flange or flanges of the winch spool that is to be controlled by the brake mechanism. The adapter may be of circular configuration and may include a vertical generally planar portion adapted to be secured in generally parallel relation with the flange of the cable spool. The adapter may include a generally cylindrical transverse element having a disc connector flange disposed at the free extremity thereof. A brake disc, of either the solid or hollow liquid cooled type, may be fixed to the disc connector flange in any desirable manner, thereby positioning opposed friction surfaces of the brake disc in spaced generally parallel relation with the associated flange of the cable spool.

For the purpose of retarding rotative movement of the cable spool, a brake caliper mechanism may extend upwardly from the winch support and may be provided with at least one and preferably a plurality of pairs of brake blocks, each pair being spaced to provide a groove or channel within which is received a portion of the brake disc. Each of the brake blocks may include recess means including a generally rectangular recess for receiving a brake shoe and generally cylindrical recesses to receive piston means for actuation of the brake shoe into braking engagement with the friction surfaces of the brake disc. The various brake blocks may be communicated to a single source of pressurized actuation fluid such as hydraulic fluid that may be communicated into the cylinders to actuate the pistons and brake shoes upon selective communication of fluid pressure by manipulation of a fluid control valve.

A pneumatic/hydraulic fluid supply system may be provided with means that respond automatically to predetermined decrease in the fluid pressure within the fluid supply system to actuate the brake mechanism to the locked position thereof to prevent rotation of the spool until such time as the fluid supply system is again restored to its proper pressurized condition.

If desired, the brake disc may be solid or, if cooling is appropriate, the brake disc may be provided with an internal annular channel through which coolant material, such as water, may be circulated to remove heat created by a braking operation.

It is an important feature of the invention that the adapter element of the present invention may be substituted for a drum of a conventional band type brake system, thereby effectively allowing a band type brake system to be converted simply and inexpensively to a disc type brake system according to the present invention.

BRIEF DESCRIPTION OF THE DRAWINGS

So that the manner in which the above recited features, advantages and objects of the present invention, as well as others which will become apparent are attained and can be understood in detail, more particular description of the invention, briefly summarized above, may be had by reference to the preferred embodiments thereof illustrated in the appended drawings, which drawings form a part of this specification.

It is to be noted, however, that the appended drawings illustrate only typical embodiments of the invention and are therefore not to be considered limiting of its scope for the invention may admit to other equally effective embodiments. In the drawings:

FIG. 3 is a front elevational view of a cable winch structure having a disc brake structure connected thereto in accordance with the teachings of the present invention.

FIG. 4 is a fragmentary sectional view of a winch flange illustrating the brake disc adapter and brake disc of FIG. 2 in greater detail.

FIG. 5 is a fragmentary view of the brake caliper mechanism of FIG. 1 having one side thereof illustrated in section and showing the brake shoe and piston structure thereof in detail.

FIG. 6 is an elevational view of one of the brake blocks of the brake caliper mechanism rotated 90° with respect to FIG. 5 and illustrating the brake block structure in detail.

FIG. 7 is a fragmentary sectional view of a cable spool flange illustrating an adapter and a fluid cooled brake disc element being supported in assembly with the spool flange structure.

FIG. 8 is a side elevational view of a fluid cooled brake disc structure having parts thereof broken away and shown in section.

FIG. 9 is a schematic view illustrating the fluid control system and automatic safety mechanism of the invention.

DESCRIPTION OF PREFERRED EMBODIMENTS

Figure 1:
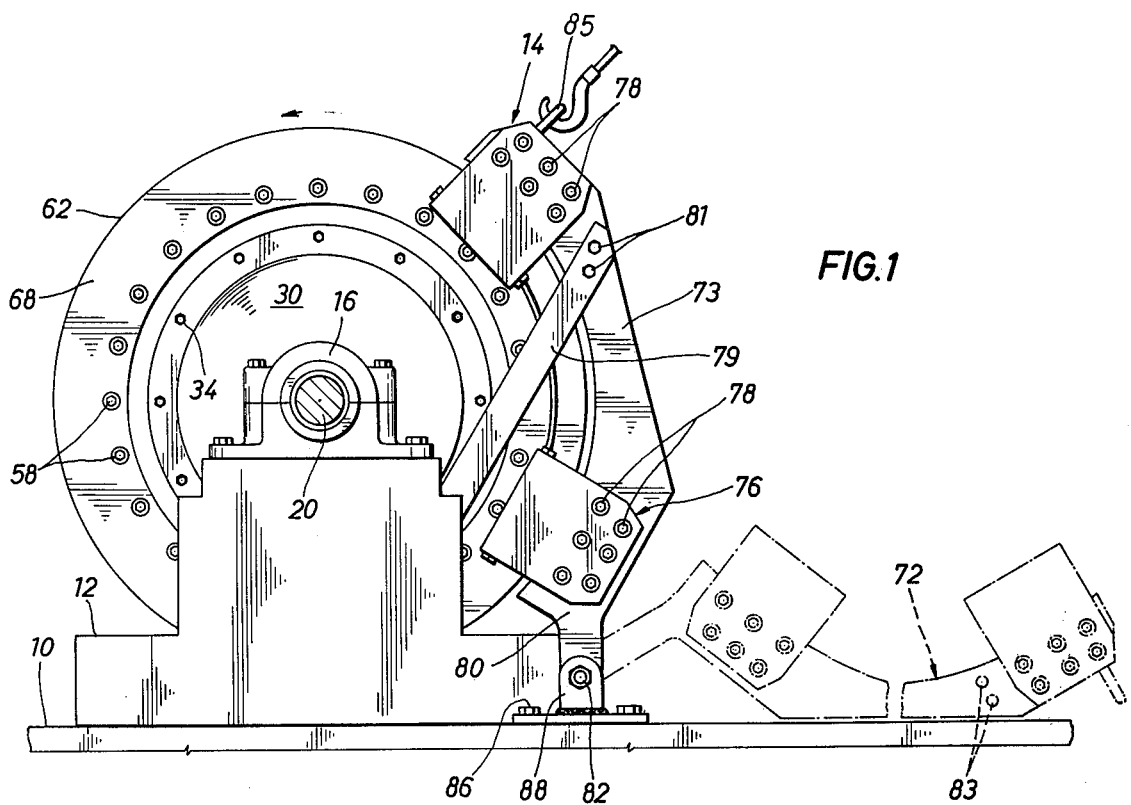
FIG. 1 is a side elevational view of a winch spool structure having a brake disc connected thereto in accordance with the present invention and illustrating a brake caliper in the operative position thereof as shown in full line and in the inoperative position thereof as shown in broken line.

Now referring to the drawings and first to FIGS. 1 and 3, there is illustrated a winch support base 10 which may be a support deck or chassis of a portable or stationary drilling rig or the like. A pair of bearing supports 12 and 14 may be secured to the winch support in any suitable manner and may be provided with bearings 16 and 18, respectively, receiving the horizontal shaft 20 of a winch spool, illustrated generally at 22. The winch spool may include a generally cylindrical cable support or cable carrier 24 having generally circular flanges 26 and 28 disposed at each extremity thereof. The shaft 20 may extend through the cable carrier 24, if desirable, or, as illustrated in FIG. 3, may be provided with shaft connector elements 30 and 32 that are secured to the flanges 26 and 28 of the spool by a plurality of bolts, such as illustrated at 34. The cable spool structure, of course, may be of any other suitable construction without departing from the spirit or scope of the present invention.

It may be desirable to provide the cable spool structure with a disc brake system. In the event the spool structure 22 may have been previously provided with a band and drum type brake mechanism, it may be deemed appropriate to convert the cable spool structure to a disc type brake system to allow the cable spool structure to support a greater load and to facilitate ease of future repairs and maintenance.

Due to the requirements for draw work systems of drilling rigs to be as compact as possible, it is not considered feasible to increase either the diameter of the cable spools of the draw works or to increase the width of the cable spools in order to accommodate a disc brake system. It is largely for this reason that disc brake systems have not been heretofore widely employed to provide drilling rig draw work systems with braking capability. It is necessary therefore that a disc brake system for drilling rig draw works conform to the space limitations of present draw work design. According to the present invention, such disc brake structure may conveniently take the form illustrated particularly in FIGS. 1 through 5. With reference now to FIGS. 3 and 4, an adapter, illustrated generally at 36 as an annular ring element, may be provided with a vertical generally circular portion 38 having a generally planar surface 40 that may be disposed in engagement with a planar surface 42 defined by the flange 26 to positively locate the adapter with respect to one of the flanges of the spool structure. A plurality of threaded apertures 44 may be formed in the circular portion 38 of the adapter within which may be received a plurality of bolts 46 in appropriate apertures 48 formed within the spool flange. The adapter 36 may also include an integral transverse portion 50 that may be of generally cylindrical configuration and may be provided with an annular connector flange 52 at the free extremity thereof.

The connector flange 53 may be provided with a generally planar circular surface 54 disposed in essentially parallel relationship with the surface 40 of the adapter. A plurality of threaded bores 56 may be formed within the connector flange 52 and may receive a plurality of bolts 58 extending through a plurality of apertures 60 formed in a generally circular disc brake element 62.

The disc brake element 62 which as illustrated is an annular member or ring, will be herein referred to as a disc brake element, a brake disc or as a brake ring and it is intended that these terms are synonomous. The brake ring 62 may be provided with an inner location recess defined by a generally planar circular surface 64 and a cylindrical surface 66, the cylindrical surface being defined in concentric manner to ensure location of the brake disc 62 in concentric manner with respect to the shaft 20 of the cable spool 22. The generally planar annular surface 64 is disposed in substantially parallel relationship with a pair of opposed friction surfaces 68 and 70 defined on the brake disc element 62. With the planar surface 64 of the brake disc secured in intimate engagement with the surface 54, the brake disc will be aligned with friction surfaces 68 and 70 disposed in generally parallel relation with the flange 26 of the spool 22 thereby causing the flange to run true and smoothly in alignment with the spool structure. This feature is essential to smooth vibration free braking during operation of the winch mechanism.

Where a disc brake system is to be employed and the forces to be encountered are of great magnitude, it is typically deemed necessary to provide a disc brake system wherein the braking force as applied to each side of a brake disc in order to prevent the brake disc from yielding and becoming damaged by the force that is applied. It is also deemed appropriate, where forces of great magnitude are to be encountered, to provide movable brake shoes on both sides of a rotating disc which shoes will efficiently move into braking engagement with brake surfaces formed on the disc without causing the brake disc to be subjected to lateral thrust loads.

For the purpose of establishing braking engagement with the brake disc 62, means may be provided to bias movable brake shoes into friction engagement with the friction surfaces 68 and 70 of the brake disc 62. According to the present invention, such means may conveniently take the form illustrated in FIG. 1 where a brake caliper, shown generally at 72, may include a caliper frame 73 that may, if desired, be formed from a single metal plate. As illustrated in FIG. 1, the caliper frame 73 is shown to include upper and lower pairs of brake blocks 74 and 76, respectively. The brake blocks are secured to the caliper frame 73 by a plurality of bolts 78 extending through mating bolt apertures formed in the brake block and caliper frame structures. Each of the pairs of brake blocks are disposed in spaced relation due to the thickness of the caliper frame, thereby defining a space or groove there between adapted to receive a portion of the brake disc 68. The structural details of the brake blocks will be discussed in detail hereinbelow.

Figure 2:
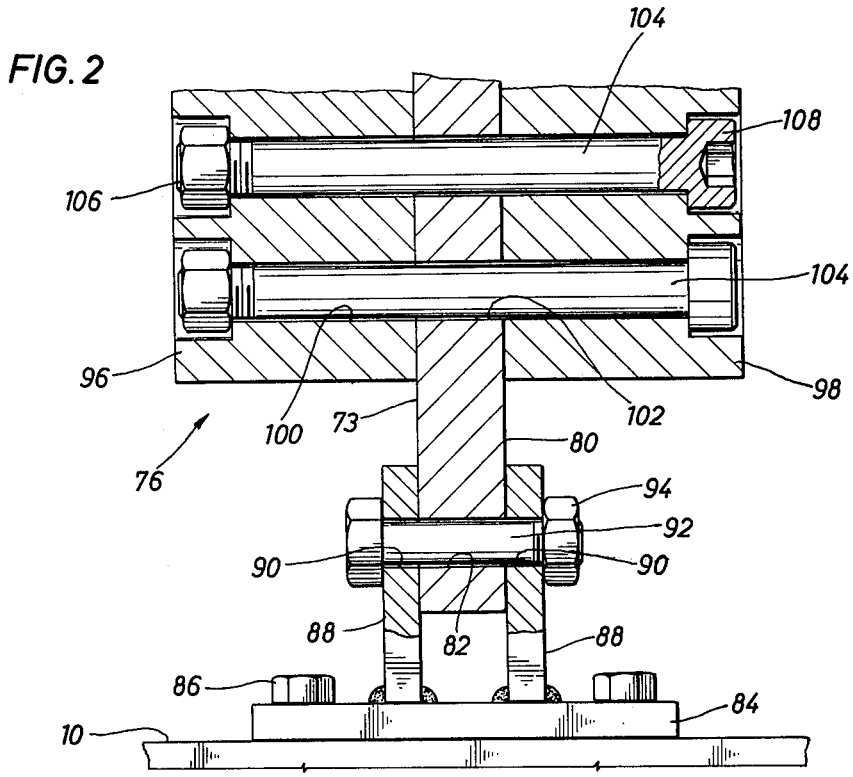
FIG. 2 is a fragmentary sectional view of the caliper mechanism of FIG. 1 illustrating the caliper support and brake block structures in detail.

As illustrated in FIGS. 1 and 2 the caliper frame 73 may be provided with a pivot extension 80 having a pivot aperture 82 formed therein. A caliper base 84 may be secured to the winch support base 10 by means of bolts 86 or by any other acceptable means such as by welding or the like and may include a pair of vertically disposed tabs 88 having aligned apertures 90 with which may be aligned the aperture 82 of the pivot extension 80. A pivot element such as a bolt or stud 92 may be extended through the aligned apertures 82 and 90 and may be secured in position to function as a pivot by a nut 94. A support brace 79 may be secured to the bearing support and may be provided with apertures to receive bolts 81 to secure the caliper mechanism in its operative position as shown in full line.

Where the brake caliper mechanism of the disc brake system is extremely heavy, for example, in the order of 100 to 3,000 pounds, it becomes difficult and in some cases impossible for the caliper mechanism to be manipulated for servicing. Accordingly, it may be desirable to provide the caliper mechanism with a mechanical means for manipulating it between the operative and inoperative positions thereof. A manipulating eye 85 may be secured to the caliper frame 73 in any desirable manner and may receive the hook of a hoist that causes the caliper to be pivoted about the pivot point 82 after bolts 81 have been removed and the caliper frame is free for pivoting. The hoist may be manipulated to pivot the caliper frame clockwise about the bolt 82 until the weight of the caliper frame is over center, whereupon the hoist may be lowered thereby allowing the caliper frame to be slowly and carefully lowered into engagement with the base 10 where the servicing operation may be conveniently conducted. After servicing, the caliper frame may be mechanically raised to its operative position by the hoist mechanism.

Where the caliper mechanism is of substantial weight it is desirable that it be balanced as much as possible. Accordingly, the caliper mechanism of the present invention is disposed in substantially vertical relation slightly off center in order that a slight force is developed tending to urge the caliper toward the brake disc. This feature allows the caliper mechanism to be efficiently supported and prevents the caliper from applying excessive force to the brake disc or to other structure of the winch mechanism.

It is also desirable that the caliper mechanism be related to the brake disc in such manner that the caliper is drawn toward the brake disc during a braking operation rather than being urged away from the brake disc. With the direction of the rotating disc shown by the arrow in FIG. 1, it is clear that the caliper will be urged by the force of braking in a direction toward the brake disc and will place the pivotal connection between the caliper and the base in tension. And in fact, the entire structure of the caliper mechanism is placed in tension by the forces of braking operations.

If the brake shoes of the caliper mechanism should become worn to the point that replacement is necessary, or if the brake blocks or brake shoes should need cleaning or other servicing, such may be accomplished with minimum down time on the brake system. To replace, repair or clean the brake shoes or brake blocks, the bolts 81 will be removed and the caliper mechanism will be pivoted from the operative position thereof, as shown in full line, to the inoperative position thereof, as illustrated in broken line. With the caliper mechanism in the inoperative position thereof, resting upon the deck 10, the brake shoes will be exposed. Since the brake shoes are loosely disposed within the rectangular recesses personnel may remove them without aid of tools. After new brake shoes are inserted into the recesses, the caliper mechanism may simply be pivotally moved to the operative position thereof and may be secured by the bolts 81 to support member 79.

With reference now to FIG. 2, there is illustrated means for securing a pair of brake blocks to the caliper frame 73. While FIG. 2 is directed particularly to connection of the lower pair of brake blocks 76 to the caliper frame, it is considered obvious that the upper pair of brake blocks may be secured to the caliper frame in similar manner.

The lower pair of brake blocks may include brake block elements 96 and 98 within which may be formed a plurality of apertures 100 that may be aligned with a plurality of apertures 102 formed in the caliper frame. Bolt members 78 may extend through the aligned apertures and may receive nut elements 106 to secure the brake block elements in assembly with the caliper frame. Although not necessary to efficient operation of the brake mechanism, the apertures 100 may be enlarged at the extremities thereof to receive the heads 108 of the bolts and the nuts 106 in countersunk relation. This features effectively presents a relatively smooth and unobstructed external brake block surface in addition to effectively restricting the overall dimension of the brake block system.

It is desirable to provide brake shoe means for engaging the friction surfaces of the brake disc and also to provide a mechanism for imparting braking movement to the brake shoe means when braking is desired. According to the present invention, such brake shoe and brake shoe actuating means may conveniently take the form illustrated in FIG. 5 wherein recess means may be formed within each of the brake blocks 96 and 98. The recess means may include a generally rectangular portion 110 and a pair of generally cylindrical recess portions 112 and 114.

A generally rectangular brake shoe may be received within the generally rectangular portion 110 and may include a metallic backing plate 116 to which may be adhered in any desirable manner a friction plate 118 that may be disposed in friction engagement with one of the friction brake surfaces of the brake disc. Each of the brake shoes is loosely disposed within the generally rectangular brake shoe recess and is retained within the recess only by the brake disc disposed in the groove or space between the brake blocks. The brake shoes, therefore, are capable of floating, thereby enabling them to be moved into positive aligned full surface engagement with the friction surfaces of the brake disc. This feature ensures positive accurate engagement between the brake disc and the brake shoes even though manufacturing tolerances may be quite large thereby enhancing the braking capability of the disc brake system.

For the purpose of imparting movement to the floating brake shoes, a pair of piston elements 120 and 122 may be disposed within the cylindrical recess portion 112 and 114, respectively, and may be sealed to the cylindrical walls of the recesses by sealing elements 124 which, if desired, may take the form of resilient O-rings or any other suitable configuration without departing from the spirit or scope of this invention.

To allow introduction of pressurized fluid such as hydraulic fluid into the cylindrical recesses below the pistons 120 and 122, a fluid passage 126 may be drilled through the brake block and may be communicated with the cylindrical recesses 112 and 114 by transverse passages or ports 128 and 130, respectively. One extremity of the passage or bore 126 may be provided with internal threads to receive a threaded plug 132 providing a closure at one extremity of the passage. The opposite extemity of the passage 126 may be also provided with internal threads to receive a tubing connector 134 through which may pass pressurized brake actuating fluid.

The brake shoes will be retracted from braking engagement with the disc by any suitable means such as the spring energized retracting mechanism illustrated in FIG. 5. A plurality of bores 127 may be formed in the brake blocks 96 and may have a reduced diameter portion defining an annular shoulder 129. Bolts may be received within the bores and may each be provided with a reduced diameter threaded portion 131 that is threadedly received within threaded apertures defined in the backing plate 116.

Springs 133 surround the intermediate shank portion of the bolts and bear against the annular shoulder 129 and the head of the bolts and serve to urge the backing plate and the friction plate 118 into fullly seated relation within the recess 110. The brake shoes are thus retracted by the springs 133 after each braking operation to prevent unnecessary drag of the brake system.

It is necessary to provide a mechanism for controlling movement of the pistons and brake shoes to achieve selective braking operation. According to the present invention, a control system for accomplishing the braking operation may conveniently take the form illustrated in FIG. 9 where a source S of pressurized gas such as compressed air may be provided as the primary motive source to accomplish the braking operation. A supply conduit 140 may be provided to conduct the pressurized gas through a filter F and a regulating mechanism R to supply compressed gas at a predetermined pressure to a control valve C that may be provided with an actuating lever 142 that may be manually manipulated for control of the brake system. A control conduit 144 may extend from the control valve C and may conduct pressurized fluid to a safety valve 146 of the type manufactured by the Westinghouse Air Brake Co. and sold under the designation Wabco H5 Relayair valve.

If fluid pressure enters the safety valve 146 from conduit 144 through conduit 150, such fluid pressure, if above a predetermined minimum, will be communicated to an air/oil booster that energizes the hydraulic system. A conduit 148 is disposed in communication with the safety valve 146 and is communicated through a check valve 154 to an accumulator 156 and an accumulator supply conduit 158. A conduit 160 is connected to the valve 146 and is adapted to conduct pressurized fluid from the safety valve to an air/oil booster 162 which in turns conducts pressurized hydraulic fluid to the conduits 136 to supply energy for driving the pistons and brake shoes.

The air/oil booster may comprise a double ended piston 164 having a large surface area 166 at one extremity thereof and a relatively small surface area 168 at the opposite extremity thereof. Fluid pressure, supplied from the conduit 160 to the large surface area 166 of the piston, functions through the small surface area 168 of the piston to substantially increase the pressure of the hydraulic fluid. For example, it has been found that a piston having a surface area ration of 25 to 1 will, in response to application of 100 psi to the large surface area thereof, product sufficient hydraulic pressure (2500 psi) to actuate the brake mechanism even under extremely heavy loading.

For the safety valve mechanism 146 to function properly, gas pressure being introduced through conduit 144 into the safety valve mechanism must be of at least a predetermined minimum pressure. If, for any reason, the pressure within conduit 150 should fall below the predetermined minimum pressure, such as might occur if a fluid supply line should rupture, the safety valve will automatically move to a position preventing back flow of pressurized gas into the conduit 148 and communicating fluid pressure from the accumulator to the air/oil booster through conduit 158. When this is accomplished, the gas pressure within the accumulator, being at the maximum to which conduit 144 may have been pressurized, will be communicated to the large surface area 166 of piston 164. Assuming the accumulator 156 to be pressurized to 100 psi, the safety valve mechanism will function automatically to communicate 100 psi to the air/oil booster, thereby causing hydraulic fluid at 2500 psi to be delivered from the booster to conduit 136 which, as illustrated in FIG. 9, communicates the pressurized hydraulic fluid to all of the brake blocks simultaneously. The pistons 120 and 122 of each of the brake blocks will be immediately moved, thereby forcing the associated brake shoes into locked engagement with the associated brake discs.

The brake control mechanism may be again placed in its operative condition simply by introducing gas pressure from conduit 144 into the safety valve at a pressure above a predetermined minimum necessary for operation of the safety valve.

With reference now to FIGS. 7 and 8, a modified embodiment of the present invention is illustrated incorporating a brake disc element that may be cooled during operation to substantially reduce the problem of brake fade and to enhance the wear life of the friction surface of both the brake shoes and the brake disc. According to the present invention, a fluid cooled disc brake system may conveniently take the form illustrated in FIGS. 7 and 8 where a brake disc 170 is shown to be fixed by a plurality of bolts 172 to a brake disc adapter 174 of the same structure and function as the adapter 36 set forth in FIG. 4. The brake disc 170 may include side walls 176 and 178 that may be secured to or formed integrally with an annular connector portion 180. The brake disc may be also provided with a peripheral ram portion 182 that may be welded or otherwise fixed to the side walls 176 and 178 to define an annular coolant passage 184. A transverse wall 186 may be disposed within the brake disc and may provide a partition separating the inlet and outlet extremities of the flow passage or channel 184. A supply conduit 188 may conduct coolant fluid such as water from any suitable supply into the passage 184 and a discharge conduit 190 may conduct coolant fluid from the passage 184 to a suitable facility for disposal of the same. As coolant fluid circulates within the channel 184, it absorbs heat from the surrounding metal structure which heat is discharged along with the coolant through conduit 190. The friction surfaces of the brake disc will not become overheated through prolonged operation.

In view of the foregoing, it is apparent that the present invention provides a novel disc brake system for the cable spools of drilling rig draw works or the like that is specifically designed to provide optimum braking capability in addition to providing a brake system that is capable of positively locking a cable spool in the event fluid actuation pressure should fall below a predetermined minimum level. The disc brake mechanism of the instant invention effectively eliminates the problem of lost motion movement that is ordinarily associated with self-energized type band brake systems. A braking operation utilizing the disc brake system of the present invention provides smooth and effective braking because the brake shoes are disposed in fully engaged relation with the friction surfaces of the brake disc at all times because the brake shoes have a floating capability tending to eliminate problems of misalignment due to tolerances.

A disc brake mechanism, according to the present invention, may be readily and inexpensively substituted for conventional band and drum type brake systems thereby giving greater braking capability to a cable spool than would be possible through the use of conventional band type brakes.

In the event the friction surface of the brake shoes should become worn, the brake caliper may be unbolted from its upper support and may be pivoted away from the brake disc thereby exposing the brake shoes of the brake blocks. Since the brake shoes are merely loosely positioned within the recesses provided therefor, they may be simply removed without the use of tools and may be replaced with new brake shoes. When replacement of the brake shoes is necessary, such can be accomplished in a very few minutes thereby substantially reducing the amount of down time on the brake system as compared to replacement or repair of the brake bands of band type brakes.

Serviceability of the brake system of this invention may be enhanced considerably by providing fluid cooled brake discs that retard wear and reduce the problem of brake fade ordinarily associated with brakes that become overheated. The invention therefore is seen to attain all of the objects and advantages hereinabove set forth together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit and scope thereof, it is to be understood that all matters hereinabove set forth or shown in the accompanying drawings are to be interpreted as illustrative and not in a limiting sense.

What is claimed is:
1. A winch spool and brake assembly comprising:
   a winch spool having cable wound thereabout, said cable winding and unwinding relative to said spool upon rotation of said spool;
   a pair of flanges one of which is disposed at each extremity of said spool for containing said cable as the cable is wound about the spool;
   base means supporting said cable spool;
   brake disc means extending from at least one of said flanges and having peripheral portion thereof disposed in spaced relation with said one of said flanges, said peripheral portion defining an inner brake surface spaced from and facing said one of said flanges and an outer brake surface facing away from said one of said flanges;
   an elongated brake caliper means including a supporting arm means being of substantially the same thickness as the thickness of said brake disc, said supporting arm means having a connector portion at one extremity thereof, said connector portion being pivotally connected to said base means and supporting at least one pair of spaced brake shoe carrier blocks disposed one on each side of said arm means, so that when said supporting arm means is in an operative position, one of said brake shoe carrier blocks is disposed between one of said flanges and said brake discs and in juxtaposed relation with said inner brake surface and the other of said brake shoe carrier blocks is disposed outwardly of said brake disc in juxtaposed relation with said outer brake surface, said arm means being pivotable about the pivotal connection to said base means from an operative position, where said pair of spaced brake shoe carrier blocks receives the periphery of said brake disc therebetween, and an inoperative position, where said caliper means rests upon said base means with said brake disc carrier blocks positioned for removal and replacement of brake shoe means;
   brake shoe means being carried by each of said brake shoe carrier blocks for respective braking engagement with said inner and outer brake surfaces;
   hydraulic actuator means being carried by each of said brake shoe carrier blocks and, upon being energized, causing braking movement of said brake shoe means;
   hydraulic means for controllably energizing said hydraulic actuator means and being connected to each of said brake shoe blocks and causing simultaneous actuation of said hydraulic actuator means and said brake shoe means; and
   releasable locking means supporting said arm means in a position relative to said brake disc that causes said caliper supporting arm means to be placed in tension by the force applied thereto during braking in one direction of the said spool's rotation.

2. A winch spool and brake assembly as recited in claim 1, including:
   power actuated means for imparting movement to said caliper supporting arm means between the operative and inoperative positions thereof.

3. A winch spool and brake assembly as recited in claim 1, wherein:
   said brake disc is of substantially the same diameter as the diameter of said one of said flanges.

4. A winch spool and brake assembly as recited in claim 1, wherein:
   said brake disc means is removably fixed to said one of said flanges.

5. A winch spool and brake assembly as recited in claim 1, wherein:
   coolant passage means is formed in said brake disc means; and
   coolant supply means is communicated to said coolant passage means and circulates coolant fluid through said coolant passage means to remove heat from said disc means.

6. A winch spool and brake assembly comprising:
   a cable spool having cable wound thereabout, said cable winding and unwinding relative to said spool upon rotation of said spool;
   a pair of flanges one of which is disposed at each extremity of said spool for containing said cable as the cable is wound about the spool;
   base means rotatably supporting said cable spool;
   brake disc means extending from at least one of said flanges and having a peripheral portion thereof disposed in spaced relation with said one of said flanges, said peripheral portion defining an inner brake surface spaced from and facing said one of said flanges and an outer brake surface facing away from said one of said flanges;

an elongated brake caliper means including a supporting arm means being of substantially the same thickness as the thickness of said brake disc, said supporting arm means having a connector portion at one extremity thereof, said connector portion being pivotally connected to said base means and supporting a plurality of pairs of spaced brake shoe carrier blocks, so that when said supporting arm means is in an operative position one of each pair of said brake shoe carrier blocks is disposed between one of said flanges and said brake disc and in juxtaposed relation with said inner brake surface and the other of each pair of said brake shoe carrier blocks is disposed outwardly of said brake disc in juxtaposed relation with said outer brake surface, said supporting arm means being pivotal about the pivotal connection to said base means from an operative position, where said pairs of spaced brake shoe carrier blocks receives the outer periphery of said brake disc therebetween, and an inoperative position where said brake shoe carrier blocks are retracted from said brake disc;

brake shoe means being carried by each of said brake shoe carrier blocks and being positioned for respective braking engagement with said inner and outer brake surfaces, said brake shoe means being exposed for repair or replacement upon movement of said arm means to said inoperative position;

hydraulic actuator means being carried by each of said brake blocks and, upon being energized, controllably forcing said brake shoe means against said inner and outer brake surfaces and controllably retarding rotation of said cable spool; and hydraulic means for controllably energizing said hydraulic actuator means and being connected to each of said hydraulic actuator means and causing simultaneous actuation of said brake shoe blocks and said brake shoe means.

7. A winch spool and brake assembly as recited in claim 6, wherein each of said brake shoe carrier blocks comprises:

a block having connector aperture means formed therein, having at least one brake shoe recess formed therein and having at least one piston bore formed therein and intersecting said brake shoe recess;

said brake shoe means being received within each of said brake shoe recesses;

a hydraulic piston being received within each of said piston bores and, upon being energized, said piston urging said brake shoe means toward said brake disc means;

a controllable hydraulic fluid supply system for controllably energizing said piston means; and means for retracting said brake shoe means upon deenergization of said piston by said hydraulic fluid supply system.

8. A winch spool and brake assembly as recited in claim 6, wherein said caliper means includes:

releasable locking means supporting said supporting arm means in said inoperative position and being releasable from said supporting arm means to allow said supporting arm means to pivot to said inoperative position.

9. A winch spool and brake assembly as recited in claim 8, wherein:

said supporting arm means is of substantially the same thickness and the thickness of said disc and said brake shoe carrier blocks are secured to opposite sides of said supporting arm means.

10. A winch spool and brake assembly as recited in claim 8, wherein:

said brake disc is of substantially the same diameter as the diameter of one of said flanges of said cable spool.

11. A winch spool and brake assembly as recited in claim 10, wherein:

said brake disc means is removably fixed to said one of said flanges.

12. A winch spool and brake assembly as recited in claim 11, wherein said brake disc means comprises:

a generally circular brake disc adaptor being secured to said flange of said spool in substantially concentric relation with the axis of said spool, said adaptor having a first generally circular portion being secured to said flange having a generally cylindrical poriton integral with said first circular portion and extending transversely of said generally circular portion and having a second generally circular portion formed integrally with said generally cylindrical portion; and said brake disc being connected to said second generally circular portion of said disc adaptor and being disposed in spaced and substantially parallel relation with said flange of said spool.

13. A winch spool brake system comprising: a base;

a spool for winding cable rotatably supported on said base;

a flange at each end of the spool;

a brake disc element having two annular braking surfaces, one surface being on each side of said brake disc element;

means for attaching said brake disc element to the peripheral portion of one of said flanges so that said brake disc element is parallel to and spaced from said flange, said attaching means being connected to said brake disc element so that said annular braking surfaces are exposed for engagement by braking elements;

a support frame for a caliper type brake carrier;

at least one pair of brake carrier blocks positioned on said support frame and spaced apart a sufficient distance to span the peripheral portion of said brake disc element;

braking elements mounted on each of said brake carrier blocks in a position adjacent the peripheral portion of said brake disc element when said blocks span the peripheral portion of said disc element;

means for pivotally connecting said support frame to said base with said support frame being so formed and said connecting means being so positioned that when said support frame is swung to an operative position, the peripheral portion of said brake disc element is received between the brake shoes of each pair of brake shoe carrier blocks and when the support frame is moved to an inoperative position, the support frame rests upon the base; and means for controlling engagement and disengagement of said brake shoes with said brake disc element.

14. The system of claim 13 wherein the controlling means includes:

hydraulic actuating means carried by each of said brake carrier blocks for moving said brake shoes, and hydraulic controlling means for controlling said hydraulic actuating means and for causing simultaneous movement of said brake shoes.

15. The system of claim 13 including:
means for moving said support frame from an operative position to an inoperative position.

16. The system of claim 13 including:
means for locking said support frame in an operative position.

17. The system of claim 13 wherein the attaching means for attaching the brake disc element to the spool flange comprises:
an annular ring element having spaced apart fastening members at each side thereof,
means for securing one of the fastening members to the spool flange,
means for securing the outer fastening means to the brake disc element to locate the annular ring element inwardly of the periphery of the brake disc element whereby the brake disc element is attached to the spool flange with its peripheral braking surfaces exposed at all times for engagement by the braking elements.

18. A winch spool brake system comprising: a base;
a spool for winding cable rotatably supported on said base;
a flange at each end of the spool;
an annular ring brake element;
an annular braking surface on each side of said annular ring brake element;
means for attaching said ring brake element to the peripheral portion of one of said flanges so that said ring brake element is parallel to and spaced from said flange, said attaching means being connected to said ring brake element so that said braking surfaces are exposed for engagement by braking elements;
a support frame for a caliper type brake carrier;
at least one pair of brake carrier blocks positioned on said support frame and spaced apart a sufficient distance to span the peripheral portion of said ring brake element;
braking elements mounted on each of said brake carrier blocks in a position adjacent the peripheral portion of the brake disc element when said brake carrier blocks span the peripheral portion of said ring brake element;
means for pivotally connecting said support frame to said base with said support frame being so formed and said connecting means being so positioned that when said support frame is swung to an operative position, the peripheral portion of said ring brake element is received between the braking elements of each pair of said brake shoe carrier blocks and when the support frame is moved to an inoperative position, the frame rests upon the base; and
means for controlling engagement and disengagement of said braking elements with said ring brake element.

* * * * *